ABSTRACT OF THE DISCLOSURE

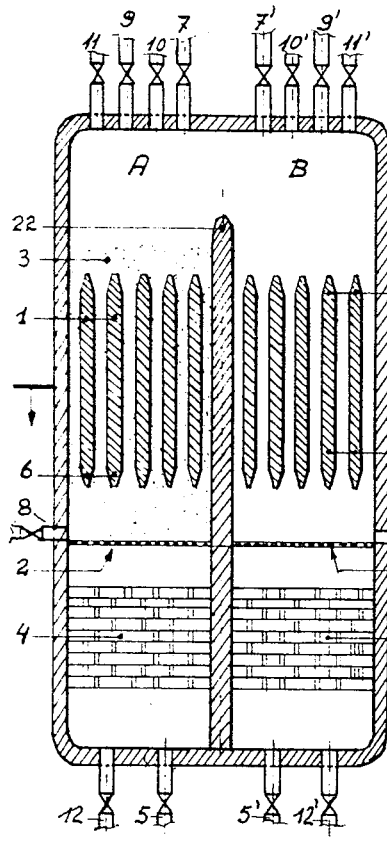
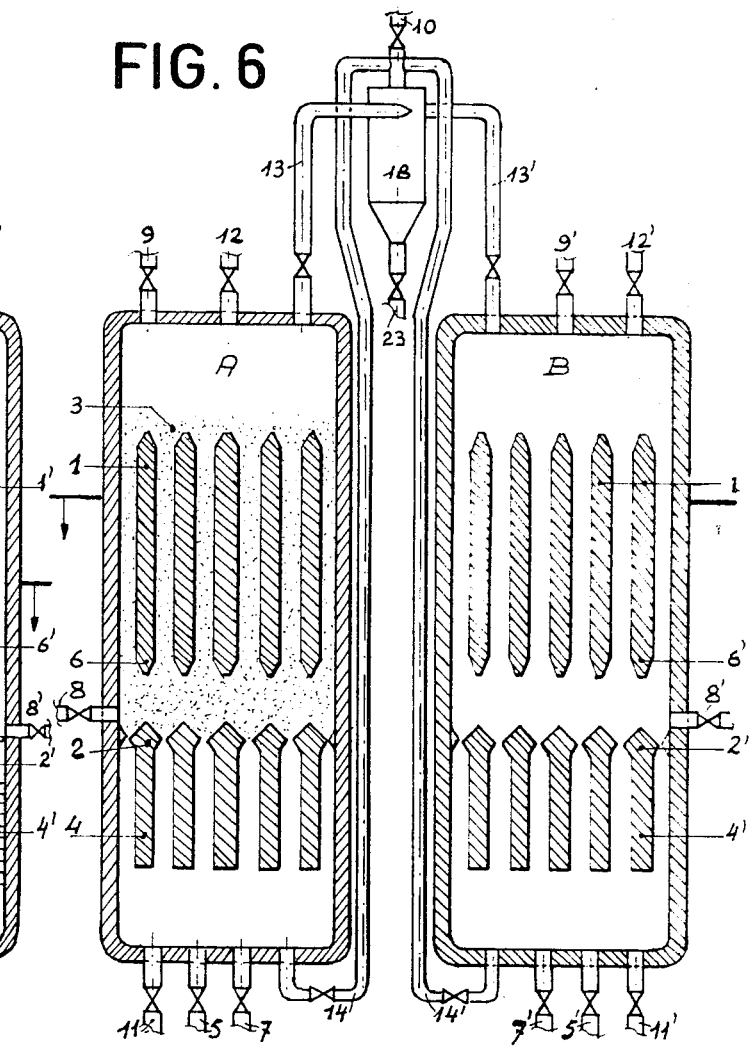
FIG. 4  
FIG. 6  
FIG. 5  
FIG. 7
INVENTOR
ALBERT GODEL
BY Bacon & Thomas
ATTORNEYS 3,677,727
PROCESS OF ACTIVATION AND GASIFICATION
OF FLUIDISED CARBONACEOUS MATERIALS
Albert Godel, Paris, France, assignor to Societe
Anonyme Activit, Paris, France
Filed Aug. 14, 1970, Ser. No. 63,845
Int. Cl. C10j *3/00, 3/04*
U.S. Cl. 48—206          7 Claims

A process for activation and gasification of granulated carbonaceous material by an activating gas, at high temperature, wherein the reaction is operated in fluidised bed within a reactor and in contact with fixed hot refractory masses capable of accumulating sufficient calories to compensate the heat losses, from the reacting medium, due to the endothermicity of the chemical activation-gasification reaction, these fixed refractory masses contained in a reactor being subjected to cyclic reheating before each activation-gasification phase.

---

Figure 1:
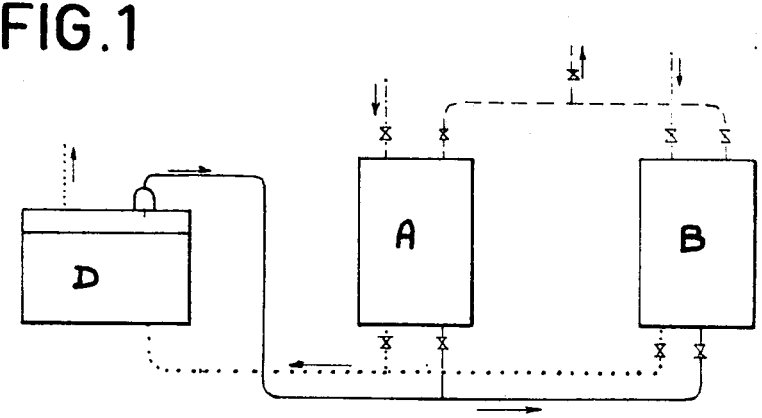

The present invention relates to a new process for the activation and gasification of carbonaceous matters in a fluidised bed.

It is known to activate and gasify such matters by high temperature reaction with an activating gas, namely carbon dioxide or steam.

It is known, for example, that the action of steam at high temperature on carbon taken to red heat enhances the following basic reactions, whose conditions of equilibrium depend upon temperature and pressure:

(I) $C + H_2O = CO + H_2 - 28.8$ K. calories per mole 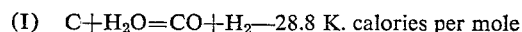

(II) $C + 2H_2O = CO_2 + 2H_2 - 14.8$ K calories per mole 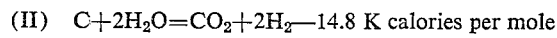

From 1000° C. the dominant reaction corresponds to Formula I which is at the base of the main industrial method for the production of active carbon and consequently of the production of hydrogen-rich water gas.

The essential difference between these two productions resides in the fact that:

for the industrial manufacture of active carbon, the gasification of the carbon is not forced as far as its limit and that it is advantageous to use particularly reactive low ash content raw materials such as wood carbon, lignite, peat coke, coal coke, agglomerates, etc.; as the production of gas is necessarily concomitant, these gases are generally used for heating the furnace and possibly for producing steam.

on the other hand, if only water gas is to be produced, the carbonaceous raw materials which are generally used are lower value coal or coke and the gasification is forced to its limit.

It should be noted that as the above reactions I and II, and particularly reaction I, is very endothermic, they cannot be pursued at the optimum temperature without a considerable addition of heat being supplied from the outside. Now, the means for effecting such an addition of heat constitute a problem which is still not satisfactorily solved, as well be appreciated in the following:

In certain known processes for manufacturing active carbon where the reaction is effected either in a fixed bed or in a fluidised bed, an addition of heat is obtained by adding a small fraction of combustive air to the superheated steam at high temperature. Now, this results not only in a considerable reduction in yield of activated carbon with respect to the raw material but also in a reduction in the calorific value of the gas produced.

In other known processes, the addition of heat is obtained:

either by an increase in the output and temperature of superheated steam and this then results in an increase in consumption as well as a loss of yield of activated carbon due to an increase in the carry-over, consecutive to the increase in gas emission,
or also by the pre-heating of the carbonaceous materials, but this operation is rather delicate and not often carried out.

However, in any case, both artificial means can contribute only a small amount—of the order of one-tenth—to the consumption of calories necessary for the gasification reaction which is endothermic.

Finally, in other processes, the treatment takes place in retorts whose outer walls are heated by means of flue gases, but it is then difficult to seal them against the fuel gases under pressure at high temperature. On the other hand, if the carbonaceous materials contained in the retorts are in a fixed layer, the admission of heat through the walls is then completely insignificant due to the low heat conductivity of this layer.

If, on the other hand, the carbonaceous material contained in the retorts are in a fluidised bed, the overall heat transfer through the walls, although greater, is still insufficient to maintain the endothermic reaction, in view of the extreme disparity of the coefficients of heat transmission which exist on the one hand between the fluidised bed and the inner wall, and on the other hand between the heating flue gas and the outer wall.

Moreover, it will be noted that if the activation of the carbonaceous material is effected continuously in a fluidised bed, a supplementary factor of loss of yield in the activation reaction occurs due to the inevitable mixture which takes place, in the fluidised bed, between raw material and activated product.

The present invention which relates to a new process of activating fluidised, granulated, carbonaceous material by means of an activating gas at high temperature, namely by steam enables the various disadvantages mentioned above to be remedied.

This invention concerns a process for activating and gasifying granular carbonaceous material by an activating gas at high temperature, wherein the reaction is operated in fluidized bed within a reactor and in contact with fixed hot refractory masses capable of accumulating sufficient calories to compensate the heat losses, from the reacting medium, due to the endothermicity of the chemical activation-gasification reaction, these fixed refractory masses contained in a reactor being subjected to cyclic reheating before each activation-gasification phase.

The heating of the fixed refractory masses may be effected by any known means. It is obvious that when the gases produced by the gasification of the carbonaceous matters are combustible, the combustion of all or part of these gases may be used directly or indirectly in order to effect said addition of heat.

This is the case for example when the activating gas is steam and this case will be described more particularly in the following text.

The execution of the invention therefore resides then essentially in the use, in a group of at least two reactors which operate alternately in successive gasification and reheating phases, of fixed, refractory, heat-accumulating masses which are cyclically placed in contact:

during a gasification phase, with fluidised, granulated, carbonaceous material under the action of an activating gas, namely steam, to which they transfer calories,
then, during a reheating phase, with high temperature flue gas produced by the combustion of the combustible gases produced in another reactor.

This reheating by the high temperature flue gas may take place simply by the passage through the empty reactor containing the fixed, refractory, heat-accumulating masses, or even by their rising through an auxiliary fluidised bed constituted by finely granulated refractory material which must then be periodically charged into the reactor, then discharged. This latter variant, though more complicated, presents the advantage of effecting a more rapid and regular reheating of the fixed, refractory, heat-accumulating masses, this facilitating the balancing of the gasification and reheating phases.

Consequently, the activation of the carbon according to the invention is effected discontinuously by "batch process," this avoiding the above-mentioned disadvantage of the mixture between the raw materials which are charged in the reactor at the beginning of the activation phase and the active carbon produced which is extracted at the end of the operation and also avoiding any mixture between the fuel gas and the flue gas.

The duration of the gasification and activation phase is, according to the experience acquired, only about ten minutes for very reactive carbonaceous matters, but it may be substantially longer for the treatment of less reactive material such as agglomerates, coke or anthracite; this will have to be taken into account for the dimensioning and distribution of the fixed, refractory, heat-accumulating masses to be used if it is desired that the gasification and reheating phases are of the same duration.

A gasification group may therefore be composed of two interconnected reactors but if, on the contrary, it were not desirable that the gasification and reheating phases be of the same duration, the gasification group may comprise, according to the invention, more than two reactors, which must be interconnected so that the gas produced during the gasification phase of one of them may ensure the reheating of the other reactors.

The fixed, refractory, heat-accumulating masses must be determined so that the heat variations between the periods of gasification and heating are low and remain within the limits suitable for the process of gasification/activation.

The nature and form of the refractory, heat-accumulaing masses constituting the stackings which equip the above-mentioned reactors will be determined, within the scope of the invention, not only as a function of their heat capacity and of their heat conductivity, but also of their heat-resistance and of their non-adherence to slag. A selection of such refractory materials, as a function of the nature and the fusibility of the ash, will enable operation to be permitted with molten or also with non-molten ash assuming that adequate equipment is used. In this respect, the use of refractory slabs made out on silicon carbide has proved favourable. The steam necessary for the operations is produced by a waste heat boiler or by a gas fired boiler.

Concerning the finely granulated refractory material which possibly constitute the "auxiliary fluidised bed" mentioned above, the conditions are very different: their heat capacity and their conductivity are not essential but they must be highly refractory and preferably light. The possibility of using sulfur acceptors as said granulated refractory matters opens an increased interest in this process. The execution of the process according to the invention is illustrated in non-limiting manner in FIGS. 1–8.

Figure 2:
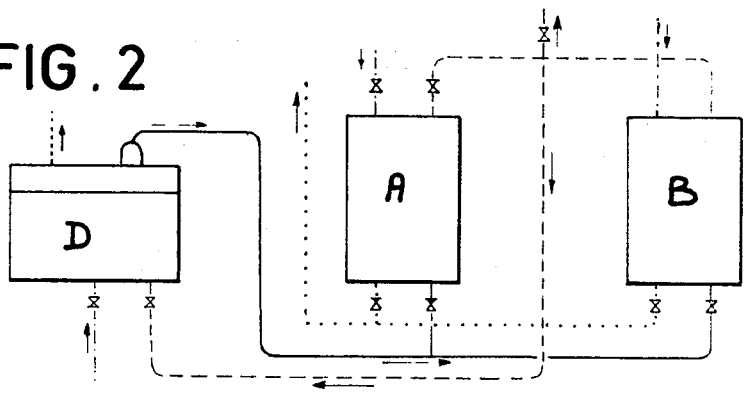
Figure 3:
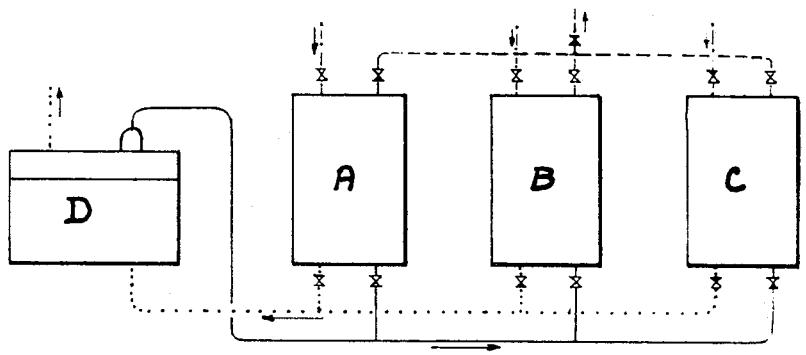

Numerous modes of grouping and connection between reactors may be envisaged within the scope of the invention; three of them are shown by way of example in FIGS. 1, 2 and 3.

The internal arrangement of reactors may be as shown in FIGS. 4 to 8.

FIG. 1 is a diagram of the connections between two reactors A and B, in which part of the fuel gas produced alternately by A is directed to the upper part of the reactor B whose reheating is ensured by combustion due to an intake of air, the flue gases issuing from the combustion are evacuated at the base of the reactor A, then directed to a waste heat boiler D which produces the steam for gasification; the operation is then reversed cyclically between A and B. A surplus of gas remains available alternately at the upper part of reactors A or B. The gas, air, vapour and flue gas circuits are shown in conformity on the diagram of FIG. 1. In this figure as in FIGS. 2 and 3, the steam circuit is represented by a solid line, the gas circuit by a dashed line, the flue gas circuit by a dotted line and the air by a dashed and dotted line.

FIG. 2 is a diagram of the connections between two reactors A and B, in which a part of the fuel gas produced alternately by each of them is directed to the upper part of reactor B (then A) as well as to a gas-fired boiler D where, due to an intake of combustive air, it ensures the reheating of the reactors and the heating of the boiler respectively. The flue gas produced by combustion is evacuated through the base of the reactors A and B on the one hand and through the stack of the boiler D on the other hand. An air reheater may possibly by placed in the circuit of the flue gas. A surplus of gas remains available alternately at the upper part of reactors A or B. The gas, air, steam and flue gas circuits are shown.

The use of gasification-activation groups with three reactors does not present any particular difficulty in connection, as appears in FIG. 3.

FIG. 3 is a diagram of the connections between three reactors A, B and C, in which part of the fuel gas produced in reactor A in gasification phase is also distributed between each of the two reactors B and C at their top; it thus ensures reheating thereof due to an intake of combustive air; the flue gas produced by the combustion in B and C is evacuated through the base and directed to a waste heat boiler D which ensures the production of steam necessary for the gasification in A.

A surplus of gas remains available alternately from the upper part of reactors A, B or C. The gasification phases follow cyclically, after the reheating phases by circular permutation between the reactors. The gas, air, steam, and flue gas circuits are shown.

A variant of the use of at least three reactors concerns the application to the complete gasification of the fuels; as then the production of the active carbon does not come into account, there is no disadvantage in feeding the reactor, during a reaction phase, several times or even continuously, and it may even be advantageous to transfer by fluidisation, during the same gasification phase, the semi-treated char of one reactor in another also in gasification phase.

The possible use of an auxiliary fluidised bed of finely granulated refractory matters during the reheating phase brings no other change in the above-described circuits than the addition of a diverted circuit for storing and charging/discharging said finely granulated refractory matters. As this circuit is similar in all points to that for storing, charging and discharging the raw, granulated, carbonaceous matters or activated carbon, it has not been considered useful to show this especially in the figures.

For the industrial execution of the process, it will be advantageous to render automatic, according to a pre-established programmation, the manoeuvring of the gas, vapour, air, flue gas feed and draining valves for the treated matters.

Concerning the actual internal arrangement of the reactors, several embodiments may be used according to the invention. Three of these embodiments are shown schematically by way of example in FIGS. 4 to 8; in order to facilitate description thereof, the arrangements showing the same objects are given the same reference numerals.

FIGS. 4 and 5 schematically show in longitudinal section and in transverse section, a gasification and activation group comprising two identical coupled reactors A and B arranged on either side of a partition 22; these reactors therefore constitute a furnace of rectangular section. Each reactor contains:

in its upper part a nest of parallel, vertical slabs 1 to 6 constituting the above mentioned fixed refractory, heat-accumulating masses which surmount a grid 2 on which the fluidised bed 3 rests, which bed is thus placed in direct contact with said masses;

in its lower part other refractory heat-accumulating masses 4 forming a "Cowper," which ensure that the stream be superheated to a sufficiently high level; the steam is injected in the base of the reactor at 5.

The fuel gas issued by the reactor A rises above the partition 22 and penetrates into the adjacent reactor B which was previously emptied of its contents of activated carbon through 8'; said gas burns therein in contact with combustive air introduced at 7'. The high temperature flue gas produced passes through the nests of slabs 1' and the "Cowper" bricks 4' which are thus reheated to high temperature; they are evacuated at 12' and ensure the heating of a waste heat boiler (not shown).

The alternating charging of the reactors A then B with carbonaceous matter is effected for example by fluidisation at 9 then 9' at the beginning of each gasification phase; the draining is also effected by fluidisation at the end of the phase through 8 and 8'. The excess of gas is evacuated during each gasification phase, respectively through 10, then 10'.

In order to put the group of reactors A–B into operation, each of them is simultaneously reheated when empty up to the service temperature by means of gas or fuel-oil burners 11 and 11'. The flue gas produced which passes downwardly through the stacking of the slabs, then the bricks forming a "Cowper," are directed through 12 towards the boiler. when the desired temperature is reached in the reactors and the boiler is under pressure, the burners are put out and the reactor group is placed into cyclic reversal operation, as described above, by injecting at the beginning of the phase, alternately in one then the other of the reactors, the carbonaceous matters in the upper part at 9 then 9'; the steam is injected from the beginning, in the lower part at 5, then 5' for the whole duration of each gasification phase then the draining of the treated products is effected through 8, then 8' at the end of each phase.

The production of gas resulting alternately for each reactor from their cyclic operation, will henceforth ensure the thermal independence of the group, with a surplus of production of combustible gas.

FIGS. 6 and 7 schematically show in longitudinal section and in transverse section, two identical gasification and activation reactors A and B, of rectangular section. Each reactor comprises in its upper part a nest of parallel vertical slabs 1–6 made of heat-accumulating refractory material, below which is arranged another nest of parallel vertical slabs 2–4 also made of heat-accumulating refractory material. The upper group of slabs 1–6 is immersed, during the gasification phase, into the fluidised bed 3, which rests on the grid constituted by the upper part 2 of the nest formed by the slabs 4, these latter being widened and shaped at the top to act as grid bars, as shown in FIG. 6.

As in the preceding example, the slabs 2–4 act as "Cowper" in order to superheat the steam which is introduced at 5 in the base of the reactor. The gas produced by the reactor A, assumed to be in gasification phase, is directed through 13 towards a cyclone 18; from there, it is distributed, after the removal of dust, for the part at 14', at the base of the reactor B, assumed to be in reheating phase, the gas surplus being for the other part evacuated at 10. The combustion of the gas is ensured at the base of the reactor B by an introduction of air 7'. The flue gas is evacuated in upward direction at 12' from where they are directed towards a waste heat boiler (not shown). The carry over of activated carbon collected in the cyclone 18 are collected at its base at 23.

The alternate filling with carbonaceous material of the reactors A and B is effected by fluidisation through 9 then 9' at the beginning of each gasification phase and draining is also effected for the activated carbon or char producing by fluidisation at the end of the phase through 8 then 8'.

The group of reactors A–B is firstly put into operation when empty, as in the preceding example, by means of burners 11 and 11'; after the temperature of the reactors has risen and the cyclic operation of the group is started, the thermal independence is ensured, with a surplus of gas evacuated at 10.

Figure 8:
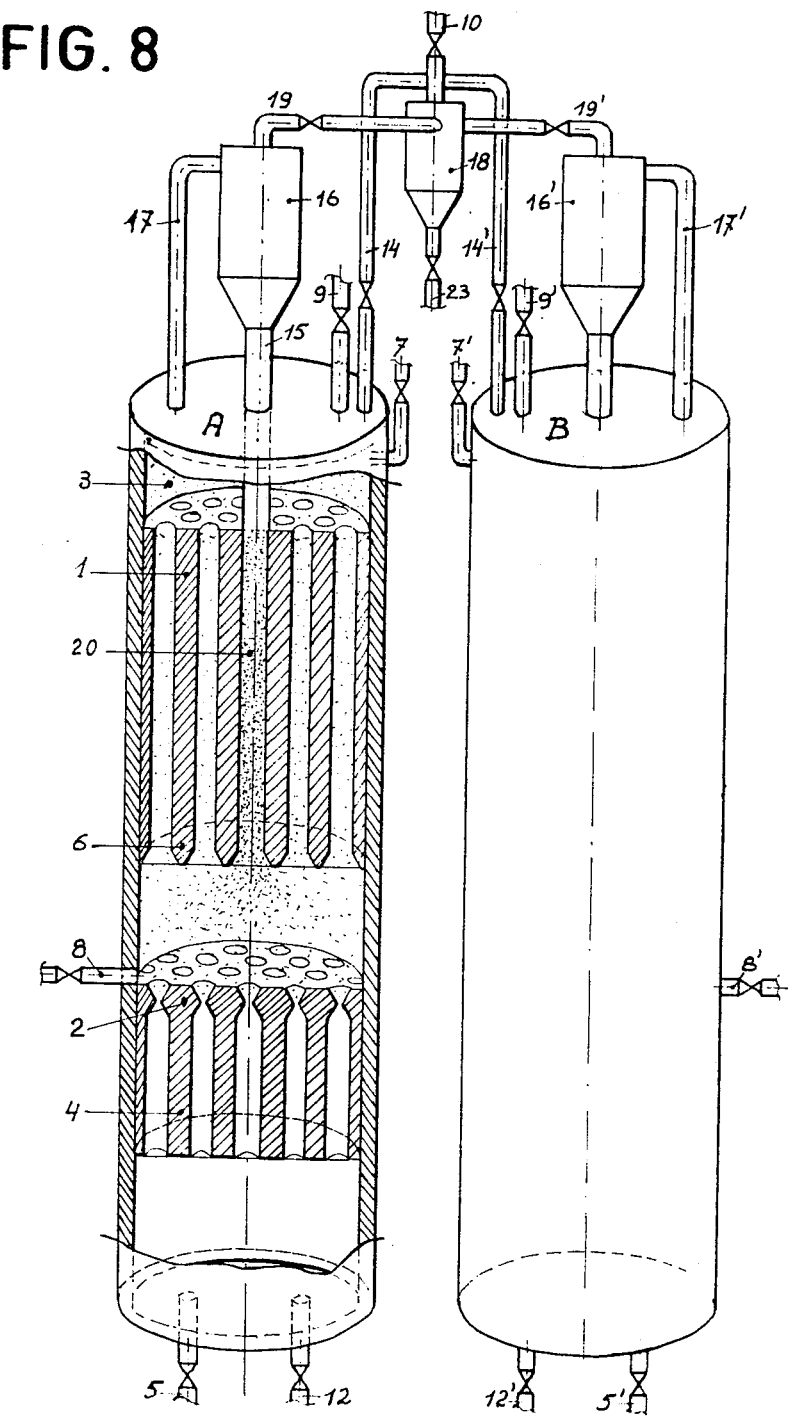

FIG. 8 schematically shows in perspective two identical gasification-activation reactors A and B, cylindrical in shape. Each of them contains in the upper part a cylindrical unit made of heat-accumulating refractory material 1–6, passed right through by a vertical multi-tubular nest of hollow cylinders capable of containing granular fluidised carbonaceous material which material is fluidised in an expanded bed under the action of a high flow of steam. This bed rests in this reactor on a grid constituted by the upper face of another fixed refractory unit 2–4 occupying the lower part of the reactor, this unit is itself constituted in the form of a multi-tubular beam whose vertical tubes which traverse it right through are upwardly narrowed in order to increase the speed of the steam introduced at 5 and thus to avoid any drop of fluidised granulated matter.

It should be noted that if the grid thus constituted at the terminal part of the tubes may serve as support for the diluted fluidised bed due to the vapour injection being effected during the whole duration of the gasification phase, it is not the same case during the reheating phase, when the circuit is reversed after draining of the diluted fluidised bed; in fact, in this last phase, the high temperature flue gases which are directed downwardly contribute on the contrary to driving through the upper apertures of the tubular nest, which are in fact only slightly narrowed, the residues of solid or molten ash possibly deposited on the upper face 2 of the unit 2–4.

The fluidised bed 3 which is of the expanded type, does not comprise, due precisely to its dilution, a definite surface of separation; it therefore expands through the tube 17 as far as the cyclone 16 which surmounts the reactor. It is in this cyclone that the expanded bed is centrifugated and that the gases are separated from the solid granular material; said matters descend, due to their density, to the base of the bed through tube 15 and through chimney 20 made in the refractory unit 1–6. The gases collected at the top of the cyclone 16 are evacuated through 19 into a second cyclone 18, intended to effect a complementary thorough removal of any residual dust. The excess gas is evacuated at 10 and the quantities necessary for the cyclic reheating of the reactor are directed towards the upper part of said latter through 14'. The gas burns at this point in contact with the air introduced through 7' and the flue gas is evacuated from the reactor through 12' in order to be directed towards the waste heat boiler (not shown). The carry over of very fine activated carbon is collected at 23.

This latter embodiment in an expanded fluidised bed according to the invention permits a considerable increase in the production of active carbon, by intensifying the gasification due to the increased volume of steam that is used.

On the other hand, the type of cylindrical casing permits operation to be effected under high pressure and consequently the capacity of production of the reactors to be increased another time.

The various embodiments mentioned hereinabove may undergo numerous variants, for example "Cowper" type steam superheaters may be placed laterally and not below the reactors, or even suppressed completely.

As a whole, the novel process forming the subject of the invention has the following advantages:

An exceptionally high production is obtained per square meter of reactor section and the investments are correspondingly reduced, this being due namely to the fact that gasification takes place in a high temperature fluidised bed by admission of pure steam at high temperature.

A gas containing no nitrogen nor carbon dioxide may be obtained by the process, said gas being rich in hydrogen and carbon monoxide, and is favorably utilised for various reactions of organic synthesis. In fact, at the temperature of 1100° which is currently reached in the process, the conditions of equilibrium at atmospheric pressure of the gasification reactions with the carbon are very nearly reached and correspond to the obtaining of a gas whose composition is as follows:

carbon monoxide 49.7%-hydrogen 49.7%-carbon dioxide 0.6% and the proportion of non-decomposed vapour is only 0.8% with respect to the total.

As this gas is a high reducing gas, it is easy to desulphurise it by conventional methods, allowing in particular the sulphur to be recovered by the well known Claus process.

Another advantage of the process resides in the fact that this hydrogen-rich gas has a density very much lower than that of the reaction gases resulting from the current methods of activation, hence a considerable reduction of the carry over and a noteworthy increase in the activation yield.

For the same above reason, the new process enables carbonaceous material of very fine grading to be activated, which material are cheap but unusable by other processes.

A supplementary increase in yield results from the fact that the process of activation is discontinuous, of the "batch type."

In the case where the fuel gas in produced under pressure, in accordance with the invention, and if it has been desulphurated with recovery of the sulphur, as mentioned above, its use may open a new way to the power production by mixed cycles from solid fuels, without emission of polluting gases, even if the fuel is rich in sulphur.

What is claimed is:

1. A process for the activation and gasification of granular carbonaceous material by reaction with an activating gas at high temperature wherein the reaction is operated in a fluidized bed of the carbonaceous material in contact with fixed hot refractory masses within a reactor, said fixed refractory masses being capable of accumulating sufficient calories to compensate for the heat losses of the reacting medium due to the endothermicity of the chemical activating-gasifying reaction and said refractory masses being subjected to cyclic reheating before each activating-gasifying phase.

2. A process as claimed in claim 1 wherein the activating gas is steam.

3. A process as claimed in claim 1 wherein the cyclic reheating of the fixed refractory masses is obtained by direct transfer of heat from a gas at high temperature wherein said gas passes through the reactor.

4. A process as claimed in claim 1 wherein the cyclic reheating of the fixed refractory masses is effected by hot gases in the presence of an auxiliary fluidised bed of granular refractory material.

5. A process as claimed in claim 4 wherein the granular refractory material is a sulfur acceptor.

6. A process as claimed in claim 1 wherein the cyclic reheating of the fixed refractory masses is effected by using the heat produced by the combustion of the gases issuing from the activating-gasifying of the carbonaceous material treated according to the invention.

7. A process according to claim 1 wherein the fluidised bed is of the expanded type, without definite upper surface, said be being in circulation between the reactor and a cyclone ensuring separation of the gases and the granular carbonaceous material, the latter being totally recycled at the base of the fluidised bed.

References Cited
UNITED STATES PATENTS

| | | | |
|---|---|---|---|
| 2,093,005 | 9/1937 | Carson | 48—202 |
| 2,187,872 | 1/1940 | Winkler et al. | 48—202 X |
| 2,302,156 | 11/1942 | Totzek | 48—202 X |
| 2,534,051 | 12/1950 | Nelson | 48—202 X |
| 2,840,462 | 6/1958 | Gorin | 48—202 X |
| 3,226,204 | 12/1965 | Stotler et al. | 48—202 X |

MORRIS O. WOLK, Primary Examiner

R. E. SERWIN, Assistant Examiner

U.S. Cl. X.R.

23—284; 48—99, 202, 210; 34—10, 57 R, A; 201—31